P. BRADY.
Metal Coupling for Ropes.

No. 222,125. Patented Dec. 2, 1879.

WITNESSES
Jesse Leary Jr.
P. Ellooney

INVENTOR
Patrick Brady.
Per M. E. Dayton
Attorney

UNITED STATES PATENT OFFICE.

PATRICK BRADY, OF CHICAGO, ILLINOIS, ASSIGNOR TO THOMAS T. BRADY, OF SAME PLACE.

IMPROVEMENT IN METAL COUPLINGS FOR ROPES.

Specification forming part of Letters Patent No. 222,125, dated December 2, 1879; application filed March 15, 1879.

*To all whom it may concern:*

Be it known that I, PATRICK BRADY, of Chicago, in the county of Cook and State of Illinois, have invented certain new and useful Improvements in Metal Couplings for Ropes; and I do hereby declare that the following is a full, clear, and exact description thereof, reference being had to the accompanying drawings, and to the letters of reference marked thereon, which form a part of this specification.

My invention relates to a metal coupling or fastening to be applied to a rope; and it consists in the combination, with tapering clamp pieces or plates, of an eye solid with the fastening hook or loop adapted to be readily applied to a rope or detached therefrom, and in the peculiar form and direction of the serrations on the inner faces of the clamp-plates, whereby the latter perfectly fit or conform to the spiral ridges of the twisted rope for the purpose of more securely grasping the rope and of avoiding all cutting or injury thereof.

Figure 1:
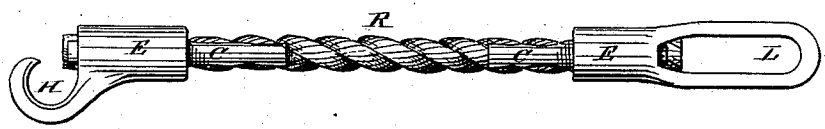
Figure 2:
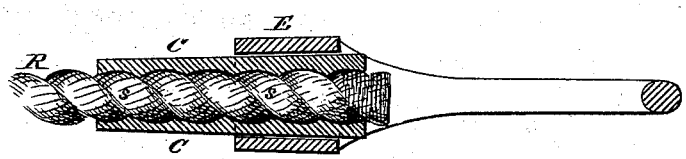
Figure 3:
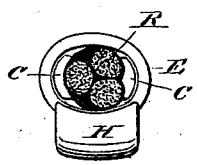
Figure 4:

Figure 1 shows a length of rope having at each end one of my improved couplings or fastenings applied thereto. Fig. 2 is a longitudinal section of the coupling applied to a rope, said section being made through the clamp-plates and showing their conformity with the surface of the rope. Fig. 3 is an end view of the coupling having a side hook solid with the eye and applied to a rope. This figure particularly illustrates the oval form of the eye by which the rope is supported where not confined by the clamp-plates. Fig. 4 is a perspective view of one clamp-plate attached, showing the spiral direction of the grooves and intermediate ridges by which the plate is adapted to fit the form of the rope-surface.

The object of my invention is to simplify the construction of rope-couplings, to adapt the same to be more readily applied and detached, to secure a more permanent hold upon the rope, and to avoid cutting or other injury to the rope by the clamping-plates.

Rope-couplings in the form of trace-fastenings have heretofore been made in four parts—namely, two clamping-plates, a hook or loop, and a detached conical ring.

In my improvement I have reduced the number of parts by making the hook or loop solid with the ring, thereby very greatly facilitating the operation of applying or removing the coupling. In making this desirable simplification I have provided for the better support of the rope where it is not covered by the clamp-plates, or, in other words, between the clamp-plates, by making the ring bearing the hook or loop of tapering oval form instead of conical. I have also formed the inner faces of the clamp-plates to perfectly fit the surface of the rope in the first instance, while in former constructions the ribs or serrations have been directly transverse to the plates. The advantages of this change are as follows: By providing that the ribs of the plates shall fit the spiral grooves of the rope-surface the minor strands of the rope are not cut or chafed, the hold of the clamp-plates is more secure, and the clamp-plates are less drawn together in drawing the eye upon them, and less longitudinal movement of the eye upon the plates need be provided for.

R is a rope of any standard size. C C are wedge-shaped clamp-plates formed on their inner faces to fit a given size of rope. E is an oval eye tapered to fit the double incline of the plates C C when applied to a rope, as shown. H is a hook and L an equivalent loop cast or otherwise formed in one piece with the eye E. By drawing upon the hook or loop the eye E binds the plates C C firmly upon the rope and remains fixed at any point to which such strain may bring it solely by friction upon the plates C.

The peculiar construction of the inner faces of the plates C is shown in Fig. 4, in which $g$ $g$ represent spirally-directed grooves, shaped to fit the surface of the strands $s$ $s$, Fig. 2, the ribs $r$ $r$ falling in the depressions between the strands. The grooves and ribs $g$ and $r$ are so located on the two plates C that when both plates are applied to opposite sides of the rope the ends of the plates will be even or in the same plane, as shown in Fig. 2.

The effect of the oval form of the eye is shown in Fig. 3, wherein it is shown as bearing upon the rope between the edges of the plates to prevent compression of the rope out of form, and also to better steady the eye laterally in position. Owing both to the spiral direction of the ribs $r$ on the inner faces of the plates C C and to the integral connection of the eye E with the hook H or loop L, the coupling is readily loosened by a blow on the end of the hook or loop, since, as above explained, only slight movement of the eye upon the plates is necessary to either gripe or release the rope, the end of the loop or hook being, moreover, in convenient position to strike while the plates are grasped by the hand.

The hook H is of a peculiar shape, being wholly at one side of the eye or rope. In a coupling so readily loosened and reapplied this form of hook is useful when it is necessary or desirable to shorten the amount of rope in use, as the eye can be slid from one point to another on a rope of any length, and the protrusion of the unused portion through the eye will not interfere with the use of the hook.

For the purpose of preventing the coupling from drawing off or slipping upon the rope by a spiral movement of the coupling, I have made shallow longitudinal ridges $r'$ in the inner face of the clamp-plates C, as clearly seen in Fig. 4. This provision is particularly useful when the coupling is applied to wire rope.

I am aware that wedge-shaped clamp-plates with internal grooves, either transverse or oblique, have heretofore been employed; but I do not claim such.

Having thus described my invention, I claim and desire to secure by Letters Patent—

1. In a rope-coupling, a hollow conical eye or shackle, E, combined with wedge-plates C C, the inner surfaces whereof are provided with spiral ribs $r$ and concave depressions between the same, so as to be adapted to fit the strands of the rope, as set forth.

2. In a rope-coupling, the plate C, the inner surfaces whereof are provided with spirally transverse and longitudinal ridges adapted to fit the surface of a rope, combined with a clamping device, whereby said plates are pressed upon the rope, without cutting or breaking its strands.

In testimony that I claim the foregoing as my invention I affix my signature in presence of two witnesses.

PATRICK BRADY.

Witnesses:
M. E. DAYTON,
JESSE COX, Jr.